United States Patent [19]

Sedlacek et al.

[11] 4,002,856
[45] Jan. 11, 1977

[54] MODULAR DISTRIBUTION FRAME ASSEMBLY

[75] Inventors: William S. Sedlacek, Chicago; Edward S. Paluch, Elmwood Park; William Andrew Brey, Schaumburg, all of Ill.

[73] Assignee: Reliable Electric Company, Franklin Park, Ill.

[22] Filed: June 27, 1975

[21] Appl. No.: 591,037

[52] U.S. Cl. .................................. 179/98; 317/122
[51] Int. Cl.² .......................................... H04Q 1/14
[58] Field of Search ............ 179/91 R, 98; 174/38, 174/60; 317/122, 120

[56] References Cited

UNITED STATES PATENTS

| 2,098,321 | 11/1937 | Treptow | 179/98 |
|---|---|---|---|
| 3,518,611 | 6/1970 | Shores, Jr. | 179/98 |
| 3,611,268 | 10/1971 | Webb | 179/98 |
| 3,711,053 | 1/1973 | Drake | 179/91 R |
| 3,781,758 | 12/1973 | Anderson | 179/98 |

FOREIGN PATENTS OR APPLICATIONS

| 1,210,338 | 10/1970 | United Kingdom | 179/98 |

*Primary Examiner*—Kathleen H. Claffy
*Assistant Examiner*—Randall P. Myers
*Attorney, Agent, or Firm*—Olson, Trexler, Wolters, Bushnell & Fosse, Ltd.

[57] ABSTRACT

A modular distribution frame assembly for carrying telephone line terminal and protection blocks in a substantially complete factory-prewired condition. The modular distribution frame has a base for securing to a floor support and a telescopic upper end for securing to an overhead support. The distribution frame assembly has a main vertical open column for receiving the plurality of jumper wires which are used to interconnect incoming subscriber or trunk lines with central office distribution lines. Incoming lines can be introduced into a secondary vertical open column located next to the main open (jumper) column for connection either directly to the appropriate protection or line terminal blocks or to a multiposition connector which has its mating half mounted to and electrically connected to the appropriate protector or line terminal blocks. Central office distribution lines are also connected either directly to the appropriate protector or line terminal blocks or to a multi-position connector which has its mating half mounted to and electrically connected to the appropriate protector or line terminal blocks. Multi-conductor cables with connectors on each end or cables wired directly to the blocks with connectors at one end only can be provided for rapid interconnection between the protector blocks and the appropriate line terminal blocks, or cables wired directly between appropriate blocks. A plurality of prewired modular distribution frames are secured next to one another in a row or circular pattern and interconnecting jumper cables are connected between selected groups of the frames to minimize the length of jumper wire needed to connect an incoming protected wire pair with a central office wire pair.

10 Claims, 7 Drawing Figures

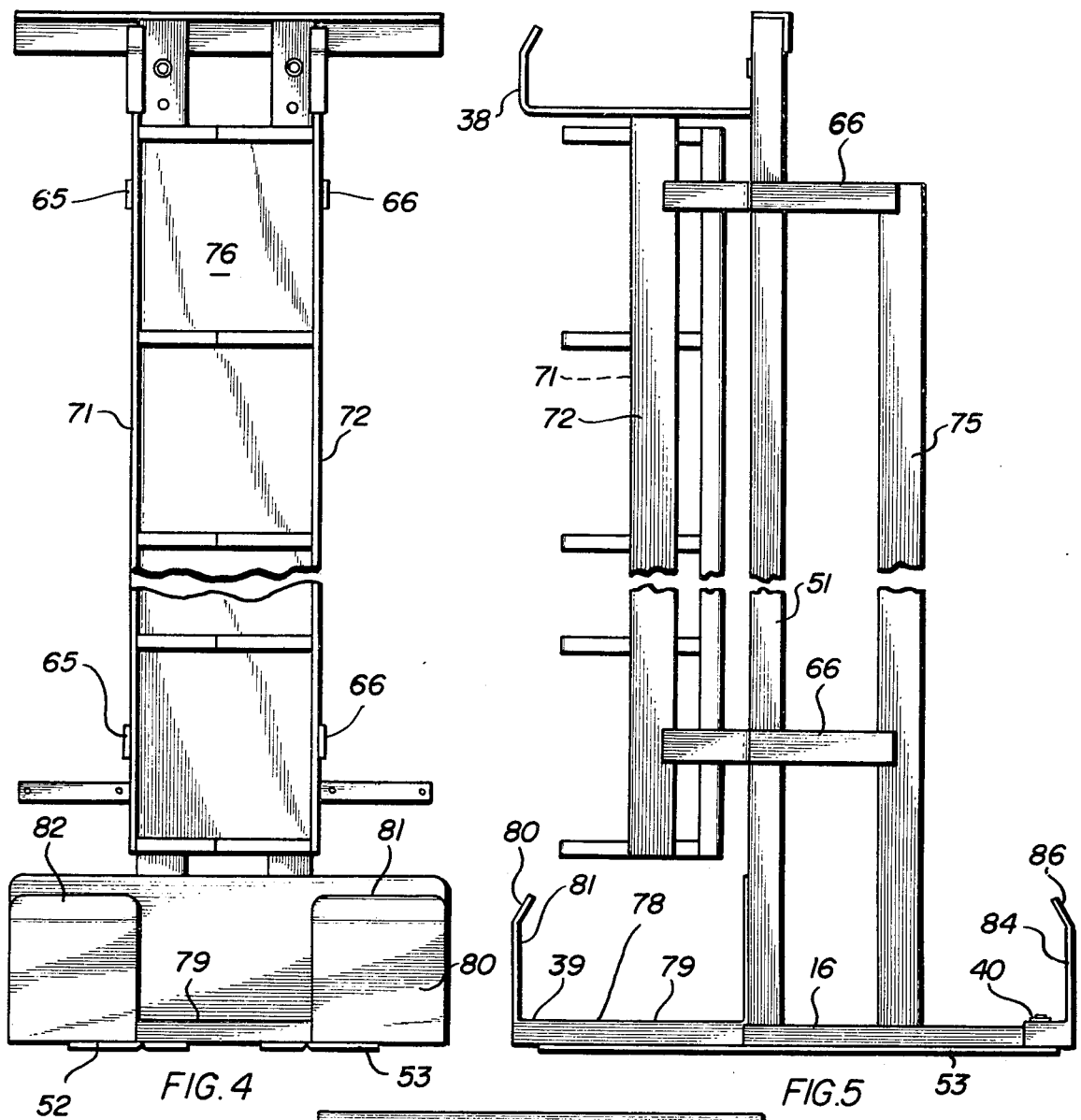
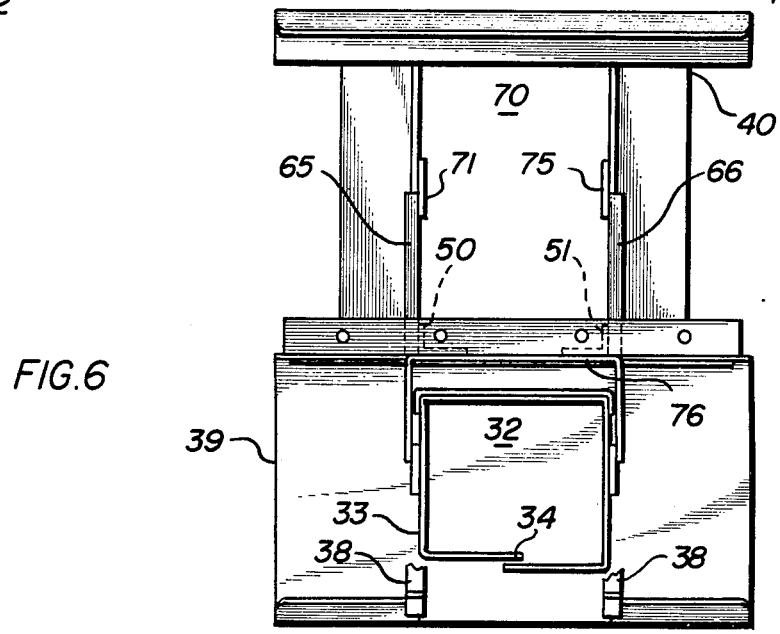

MODULAR DISTRIBUTION FRAME ASSEMBLY

BACKGROUND OF THE INVENTION

This invention relates generally to a modular distribution frame structure for use as a telephone line variable cross-connect system, and more particularly to a modular distribution frame structure wherein the protector blocks and terminal blocks are mounted thereon and substantially prewired at the origin of manufacture.

DESCRIPTION OF PRIOR ART

Distribution frames are well known in the art and generally adapted for use in conjunction with equipment such as found in a telephone distribution center. A large number of electrical impulse signal transmission lines and cables are brought to a given location for interconnection with other transmission lines at the distribution frame. Prior art structures for providing the necessary interconnection of lines and cables have been provided, but these structures have certain deficiencies which make them relatively expensive to construct and difficult to maintain. This is particularly true when there are a large number of lines accumulating on a central office distribution frame.

One of the problems encountered with prior art distribution frames is that they are erected on the site where they are to be used from a multitude of components. These components are, for example, lengths of steel angle iron and bar stock which are either bolted or welded together to fabricate the frame structure. The time consumed in fabricating the distribution frame is substantial, and in some cases requires special skilled labor such as welders. Additionally, in-field fabrication of distribution frames is generally void of quality control and, therefore, sharp edges and burrs can exist as a result of the weld joints or careless use of tools. These sharp edges may cause jumper wires to become abrated and short circuit to one another or to ground potentials through the distribution frame.

Another problem encountered in distribution frames of the prior art is the large number of long jumper wires or runs required to interconnect incoming subscriber or trunk lines with central office lines. Many attempts have been made to minimize the length of these runs of wires so that the complexity of the distribution system is held to a minimum. Furthermore, long runs of jumper wires on distribution frames increases the cost of maintaining such systems.

Still another problem encountered with prior art distribution frames is that of changing an incoming line connection from one central office terminal to another central office terminal. Such connection changes are often encountered and may consume considerable time to trace and remove the unused jumper conductor. Furthermore, when adding new subscribers to the system, jumper wires are often required to travel from one incoming line to a relatively distant location to a central office terminal.

SUMMARY OF THE INVENTION

Accordingly, it is an object of this invention to provide a new and improved modular distribution frame assembly which minimizes the amount of time required to erect at a central office, or wherever this high density cross-connect system is desirable.

Another object of this invention is to provide a modular distribution frame assembly which has substantial portions factory-wired under quality control conditions and is shipped to the site of installation as a substantially complete modular structure.

Another object of this invention is to provide a modular distribution frame assembly which minimizes the number of long jumper wire runs required to interconnect incoming subscriber or trunk lines to any one of a plurality of central office lines.

Still another object of this invention is to provide a modular distribution frame which can be used with a plurality of similar frames to form a continuous distribution system.

Briefly, the modular frame assembly of this invention is designed for supporting central office protectors and terminal blocks for cross-connecting outside plant cables and central office equipment. Protector and terminal blocks can be factory assembled and hard wired to each other before shipping or they can be interconnected by multi-conductor cables having connectors at one or both ends thereof, or by direct wiring between the numerous related circuit elements. Preferably, the modular frame assembly is fabricated of metallic and plastic components to a height of approximately 8 feet. The frame assembly is anchored to a floor and has a top telescopic portion which extends upwardly to a height of 9 feet 6 inches for connection to a suitable overhead support or securing means. The above dimensions can be varied to suit the geometry of the protector or line terminal blocks utilized.

A series of retainer rings are vertically spaced apart on the front of the modular frame to form a main open column for containing jumper wires which are used to cross-connect the outside plant cables with the central office equipment. Jumper wire support arms or pans are located at the top of the module and are used to guide jumper wires going to adjacent modules. A removable jumper tray is located at the base of the module and also guides jumper wires going to adjacent modules along the bottom portion thereof. A vertical pan is located adjacent the vertically spaced apart retainer rings and provides a barrier wall between the interconnecting jumper wires and the large multi-conductor cables coming in from below or from above. A space is provided between the back of the vertical barrier pan and two vertical angle brackets for horizontal cable runs which may be required between protectors and line terminal block within the basic module.

Many other objects, features and advantages of this invention will be more fully realized and understood from the following detailed description when taken in conjunction with the accompanying drawings wherein like reference numerals throughout the various views of the drawings are intended to designate similar elements and components.

BRIEF DESCRIPTION OF THE DRAWINGS

FIG. 4 is a front view of the modular distribution frame structure of this invention;

FIG. 5 is a side view of the modular distribution frame structure of this invention;

FIG. 6 is a top view showing the terminal block supports of the modular distribution frame of this invention; and FIG. 7 is a plan view showing twelve modular distribution frames forming a typical distribution system in a central office as contemplated by this invention.

DETAILED DESCRIPTION OF THE ILLUSTRATED EMBODIMENT

Figure 1:
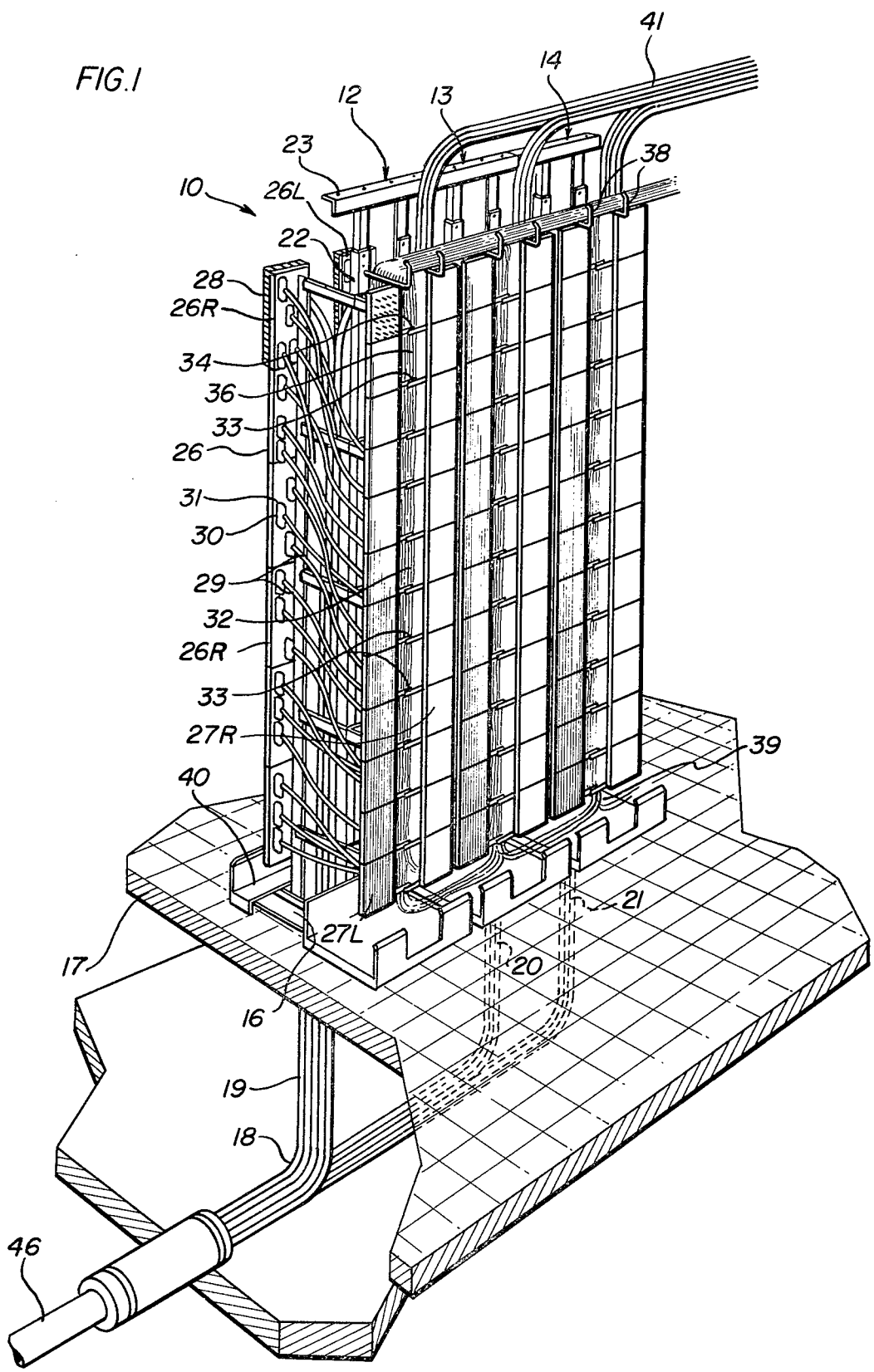
FIG. 1 is a perspective view of a plurality of modular distribution frame structures incorporated into a distribution system in a central office and illustrates the incoming subterranean cables entering the bottom of the distribution frame systems and the central office cables entering at the upper portion of the distribution frame.

Referring now to FIG. 1, there is seen a modular distribution frame system constructed in accordance with the principles of this invention and designated generally by reference numeral 10. The modular distribution frame system 10 includes a plurality of modular frame assemblies 12, 13 and 14 positioned vertically side by side in a row. While only three modular distribution frame assemblies are shown, it will be understood that any number of frames may be incorporated in accordance with the principles of this invention.

The modular frame assembly 12 has a base structure 16 for securing to a floor support 17. The floor support 17 is part of a central office exchange and the plurality of subscriber or trunk lines coming into the exchange are directed through a plurality of subterranean cables 18. The cables 18 are divided into groups 19, 20 and 21 which extend upwardly through the support floor 17 and into the frame structure of each of the modular distribution frames 12, 13 and 14, respectively. The incoming subscriber lines can be introduced from an overhead cable if desired. All of the modular frame assemblies are substantially identical in construction and, therefore, only the frame 12 will be described in detail. The modular frame assembly 12 includes a vertical frame 22 preferably formed of metallic angle iron, bar stock and channel stock, as desired. Preferably the components forming the frame are welded together and the sharp edges and welds are finished to provide smooth surfaces at all corners. This preferably is accomplished in an assembly line production at the place of manufacture rather than fabricating the support frame on the site where it is to be used. The upper end of the frame 22 is provided with a telescopic section 23 and is adjusted in the vertical direction to engage a suitable upper support, not shown in the drawing.

In accordance with one aspect of this invention, a plurality of vertically aligned horizontally spaced apart protector blocks 26L and 26R are secured to the far side of the frame while a plurality of vertically aligned horizontally spaced apart line terminal blocks 27L and 27R are secured to the near side of the frame. The protector blocks 26L and 26R have a multitude of protector elements 28 inserted into receptacles therein. The protector elements 28 on the two vertical arrays of protector blocks 26L and 26R are interconnected with appropriate contact positions of the line terminal blocks 27L forming the vertical array to the left of the main vertical open column 32 by means of interconnecting cables 29. The cables 29 preferably have at least one end thereof provided with a multi-position connector 30 which mates with a matching connector 31. The other end of the connector cables 29 may be wired directly to line terminal block contact positions either by wire-wrap or quick-clip connect method, or other suitable means, or may be connected to multi-position connectors and mated with matching connectors which can be mounted on the back side of the line terminal blocks 27L (not visible in the FIG. 1 illustration). The matching connectors in turn have been interconnected with appropriate contact positions of the line terminal blocks 27L. In essence, all incoming conductor pairs wired through protector elements 28 are now "protected" and these "protected pairs" have now been transferred to contact positions on the line terminal blocks 27L forming the vertical array to the left of the main vertical open column 32.

In a similar fashion, except not wired through any protector elements 28, the central office distribution lines (cables) 41 are routed into the basic modular frame 12 at the top via overhead cable racks (not shown) and connected by means of multi-position connectors 30 and 31 or directly wired to appropriate contact positions on the line terminal blocks 27R forming the vertical array to the right of the main vertical open column 32.

It is within this main vertical open column area 32 that most of all subsequent jumper wire 36 used will be stored while providing the desired variable interconnection between appropriate "protected pairs" appearing at contact positions on the line terminal blocks 27L on the left and related central office distribution lines (cables) 41 appearing at contact positions on the line terminal blocks 27R on the right.

It is this primary vertical jumpering zone approach which eliminates the disadvantages associated with the bulky horizontal jumper wire routing method of the prior art explained previously, and as will be explained later certain advantages in design and construction become available.

In addition, this primary vertical jumpering zone approach is not restricted to having the protected pairs on the left and the equipment pairs on the right. For example, the protected pairs can be at the top half of the pattern while the equipment pairs are on the bottom half of the pattern formed by line terminal blocks 27R and 27L.

In accordance with another aspect of this invention, the modular distribution frame assembly 12 is provided with a main vertical open column 32 formed by a plurality of spaced apart retainer rings 33. The retainer rings 33 have openings 34 formed by closely spaced apart terminating ends of the retainer rings so that jumper wires 36 can be easily inserted into the ring in a vertical fashion as seen in FIG. 1. The jumper wires 36 are connected to appropriate terminating pins of the line terminal blocks 27L and 27R of one distribution frame assembly and can be connected to another appropriate pin of another terminal block of another distribution frame assembly. Therefore, the jumper wires 36 may travel from one frame to another frame along an upper support or tray as indicated generally by reference numeral 38 or along a lower support or tray, as indicated generally by reference numeral 39. The base structure of each of the modular distribution frame assembly 12, 13 and 14 form wire run support trays on both sides thereof and designated generally by reference numerals 39 and 40. It will be seen in the system drawing of FIG. 1 that a plurality of input cables 41 extend from the upper end of each of the modular distribution frame assemblies and are directed in an overhead fashion from appropriate terminating ends at a central office equipment.

Figure 2:
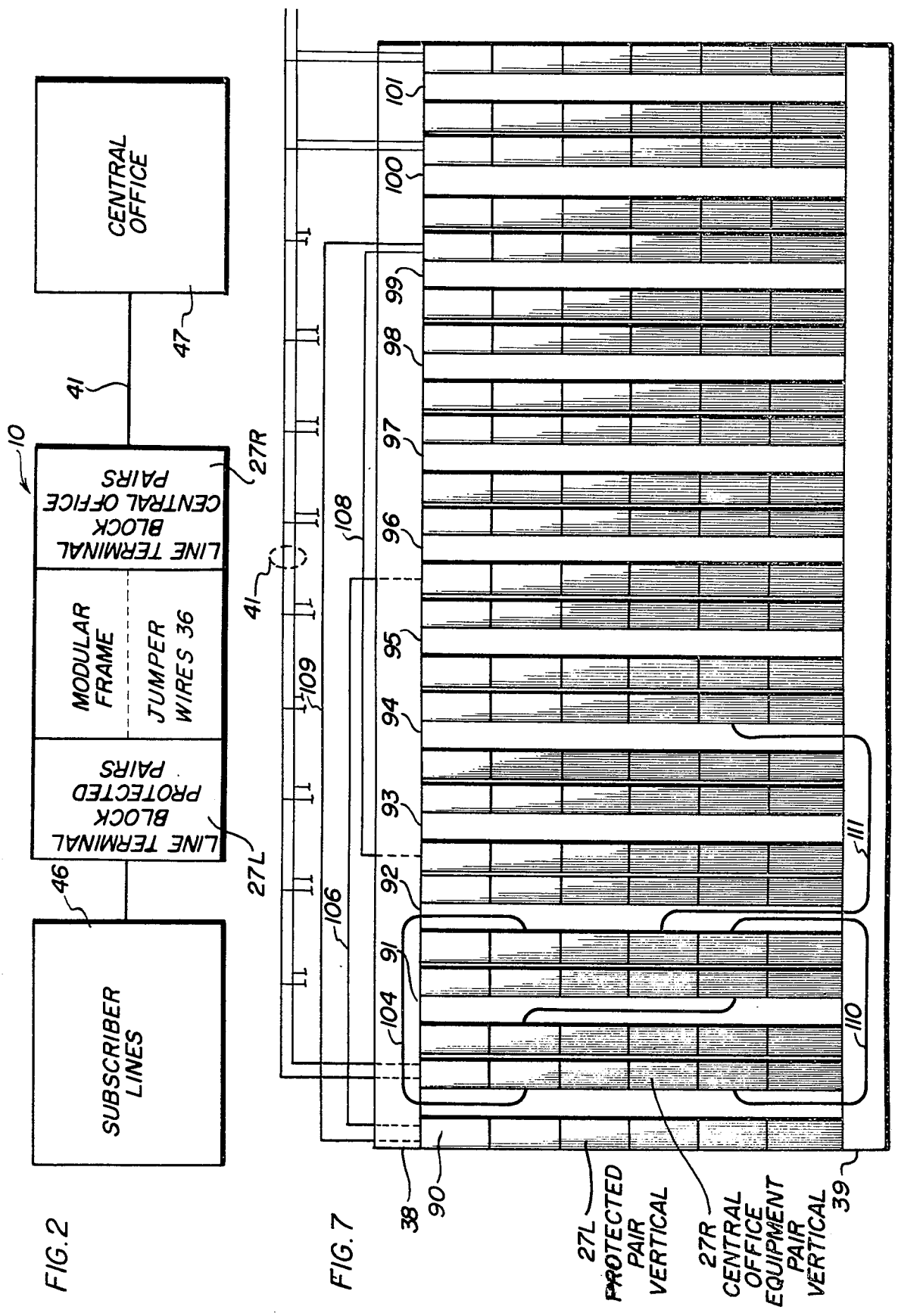
FIG. 2 is a simplified block diagram of the interconnections obtained by the novel modular distribution frame structure of this invention.

FIG. 2 is a simplified block diagram of how the improved modular distribution frame assembly is utilized in conjunction with a central office and subscriber line connection. FIG. 2 shows a plurality of subscriber lines designated generally by reference numeral 46, which corresponds to the incoming cable 46 of FIG. 1. The incoming lines are connected to terminal pins of the protector blocks 26L and 26R by either a wire-wrap, quick-connect method or other suitable means. The connector blocks 26L and 26R are electrically interconnected with the terminal blocks 27L by the interconnecting cables 29. The terminal blocks 27R are now connected to a central office terminating end 47 by means of the interconnecting cables 41. The modular frame system 10 greatly simplifies the interconnection between the incoming subscriber lines 46 and the central office terminal ends 47 by providing a unit which is substantially completely prefabricated and prewired at the factory and shipped as an assembly and secured in place only to have the appropriate connections made at the appropriate input positions.

For a better understanding of the overall structure of a single modular distribution frame assembly of this invention reference is now made to FIGS. 3, 4, 5 and 6. The modular distribution frame assembly 12 has the frame structure 22 thereof formed of a pair of spaced apart vertical L-shaped metallic members 50 and 51 which are secured to the base 16 by welding, riveting or bolting, as the case may be. The L members 50 and 51 are secured to L cross-section 52 and 53, respectively, forming part of the base 16. The vertical members 50 and 51 have spaced apart apertures 56 and 57 formed along the upper end thereof, which apertures are positioned in registry with elongated slots 58 and 59 formed in a telescopic section 60. The telescopic section 60 includes L-shaped extension bars 61 and 62 tied together across the top thereof by an L-shaped bar 63. The bar 63 has apertures 64 formed therein to which the unit is secured to an upper support.

Horizontally disposed extension bars 65 are secured to the L bar or support 50 while horizontally disposed extensions bars 66 are secured to the bar or support 51. A vertical strap 71 is secured to the bars 64 while a vertical strap 72 is secured to the horizontal bars 66. The bars 64 and 66 together with the vertical straps 71 and 72 form a receptacle designated generally by reference numeral 70. The receptacle 70 is a secondary vertical open column and receives a plurality of cables as shown in FIG. 1. The cables 19, 20 and 21 from the subterranean level extend up into the open column 70 or down into open column 70 from overhead racks as previously explained.

Figure 3:
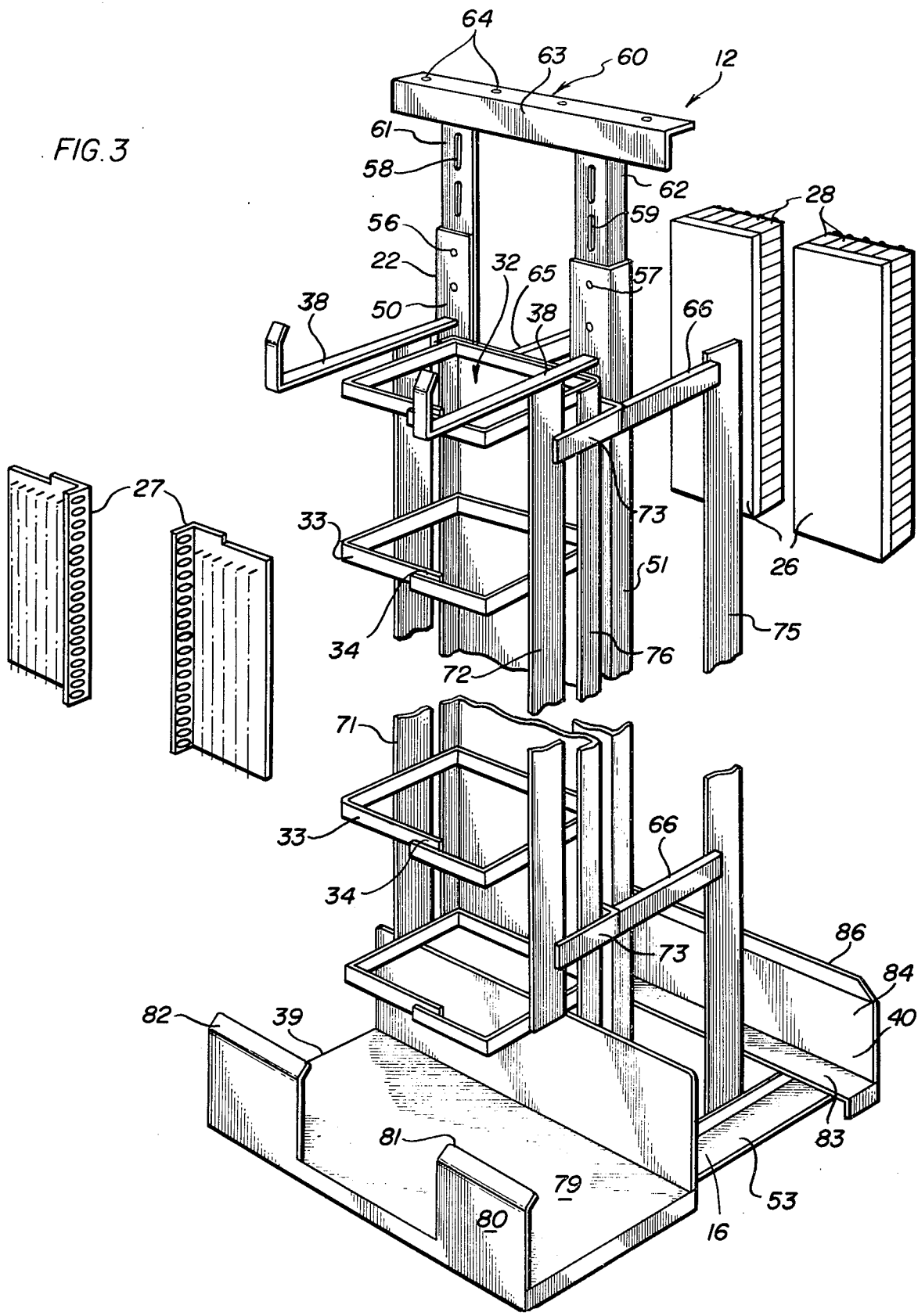
FIG. 3 is a perspective view of one modular distribution frame structure of this invention showing the feedthrough terminal blocks and the protector terminal blocks exploded therefrom for clarity.

The primary vertical open column 32 is clearly seen in FIG. 3 and the retaining rings 33 have the forward opening 34 formed by the spaced apart terminating ends of the bar stock forming the ring. The retaining rings 33 are secured to vertically disposed straps 71 and 72 which, in turn, are secured to U-shaped members 73 at the top, central and bottom portion of the frame structure. Most advantageously, the retaining rings 33 are backed by a cable retaining or barrier pan 76 which prevents the interconnecting jumper wires 36 from intermingling and interfering with the incoming multi-conductor cables 19.

To enable the interconnecting jumper wires 36 to extend from one modular distribution frame assembly to another a plurality of outwardly extending arms or brackets are formed at the upper end of each modular frame assembly. These brackets form the upper support or tray for the wires as indicated by reference numeral 38 of FIG. 1. The lower portion of each modular distribution frame assembly includes the cable trays 39 and 40, as best seen in FIGS. 3, 4 and 5.

The lower tray 39 is formed from a sheet metal having a rear wall portion 78, a floor portion 79 and a front wall portion 80 having spaced apart sections 81 and 82. The opening between the spaced apart sections 81 and 82 facilitate access to the plurality of jumper wires 36 which may be laying in the tray or trough formed thereby. Similarly, the cable pan 40 is formed by a sheet metal having a lower floor portion 83 and a vertical wall portion 84. An angled bent over upper portion 86 forms a retaining surface so that a large quantity of cables can be laid in the pan and retained therein. This is also true for the retaining tray or pan 39.

The terminal blocks 27L and 27R are secured to the vertical support frame in vertical fashion as best seen in FIG. 1, and the interconnecting jumper wires 36 attached thereto either by the wire-wrap method or by the quick-clip method, both methods being well known in the art or other suitable methods. Similarly, the protector blocks 26L and 26R, together with the plug-in protector elements 28 are secured to the opposite side of the frame assembly and the cables connected thereto are also either by the wire-wrap or quick-clip methods, or other suitable means.

The frame structure also includes vertical bars or straps 75 extending vertically from the base structure 16 to the upper end of the frame assembly. The bars 75, together with their support arms 66 form a vertical open bay or column to receive the incoming multi-conductor cables 19. Incoming overhead cables 41 are routed along the outside surfaces of arms 66 and retained by standard cable ties or guides. The distribution frame assembly provides compact storage of all of the necessary cables 19 and 41 and jumper wires 36 associated with the protector blocks 26L and 26R and the line terminal blocks 27L and 27R.

Referring now to FIG. 7, there is seen a schematic illustration of a modular distribution frame system utilizing twelve frame assemblies of this invention. The frames are positioned adjacent one another to achieve a novel interconnection method between certain groups of frames to minimize the overall length of jumper cables required to jumper from one frame assembly to the other frame assembly. The distribution frame system of FIG. 7 includes a plurality of vertical distribution frame assemblies 90, 91, 92, 93, 94, 95, 96, 97, 98, 99, 100 and 101 positioned adjacent one another in a row. The incoming overhead central office interconnecting cables are illustrated by reference numeral 41. As mentioned previously, interconnection between the distribution frame assemblies can have the jumper wires extending along the top tray or trough 38 or the bottom tray or troughs 39 and 40. For example, to interconnect a central office equipment pair on the distribution frame assembly 90 with a protected pair on the distribution frame assembly 92, a jumper wire 104 is used to accomplish the desired cross-connection along the path through the upper trough 38. For example, the entire group of distribution frame assemblies 90, 91 and 92 may have main distribution blocks thereon interconnecting all of the terminals on this group and a distribution jumper cable assembly 106 is connected from this group to the group of frame assemblies 96, 97 and 98. Similarly, the distribution frame assemblies 93, 94 and 95 have the terminals thereof connected to common distribution block or blocks and connected by a jumper cable 108 to terminal block or blocks associated with the frame assembly group 99, 100 and 101. Also connected with the distribution frame assemblies 99, 100 and 101 are the distribution frame assemblies 90, 91 and 92 over cable 109. By utilizing cable runs as described above, a secondary distribution system is provided wherein jumper cables 106, 108 and 109 rather than jumper wires 36 or 104 are utilized to interconnect remotely spaced modular frame assemblies. For example, if a jumper is required between the distribution frame assembly 90 and the distribution frame assembly 99, a jumper cable is connected from the appropriate pin on the assembly 90 to the terminal block pin associated with terminal block in the distribution frame assembly 99. Also seen in FIG. 7 are jumper cables 110 and 111 showing the interconnecting between distribution frame assembly 90 and 92 and between 92 and 94, respectively.

By utilizing modular distribution frame assemblies in accordance with this invention, a more uniform and simple field installation is obtained and a minimum of wire confusion and wire length is achieved. While a single specified embodiment of this invention has been illustrated herein, it will be understood that variations and modifications may be effective without departing from the spirit and scope of the novel concepts set forth in the following claims.

The invention is claimed as follows:

1. A modular distribution frame assembly comprising a vertically upstanding frame, a base structure, and a top structure, said base and top structures having means for securement to a subjacent and overhead supports, respectively, at least one of said structures being vertically extensible to accommodate varying spacings between said subjacent and overhead supports, a vertical array of protector blocks attached to one side of said frame, said protector blocks adapted for electrically conductive connection to subscriber lines, first and second vertical arrays of terminal blocks on the other side of said frame, said first terminal blocks having terminals thereon for electrical connection to said protector blocks, said second terminal block having terminals thereon for electrical connection to said central office equipment, means on said frame forming a main open vertical column between said protector blocks and said first and second terminal blocks, and interconnecting generally vertical jumper wires joining terminals of said first terminal block with the terminals of said second terminal block, said jumper wires being housed in said vertical column.

2. A modular distribution frame assembly according to claim 1 in which said means forming said main open vertical column comprises a series of vertically spaced retainer rings.

3. A modular distribution frame according to claim 2 in which said retainer rings are backed by a vertical barrier between the terminal blocks and the protector blocks.

4. A modular distribution system, comprising; a plurality of groups of modular frame assemblies; each frame including a base to be mounted to a support floor, a top for securing to an overhead support, and a vertical upstanding portion; a plurality of protectors secured to one side of said upstanding portion for connection to subscriber lines and a plurality of terminals secured to the other side of said upstanding portion for connection to central office lines, connector means between said protectors and said terminals, a primary vertical column to receive jumper wires therein to interconnect the subscriber telephone lines with the central office telephone lines at said distribution system by connecting said jumper wires with said terminals, a secondary vertical column to receive subscriber telephone lines; and jumper cable means connected to protector terminals of a first group of modular frames and to central office terminals of a second group of modular frames, said first and second groups of modular frames being spaced apart by the third group of modular frames, said protectors being arranged in vertically aligned, horizontally spaced apart protector blocks, and wherein said terminals are arranged in vertically aligned horizontally spaced apart line terminal blocks.

5. A modular distribution frame assembly for receiving subscriber or trunk incoming lines and central office lines, comprising; a base for securing to a floor support, a vertical frame extending from said base, a telescopic upper end secured to said vertical frame for connection to an overhead support, a plurality of protector blocks secured to one side of said frame and having means for connections to subscriber lines, a plurality of line terminal blocks secured to the other side of said frame and having means for connections to central office lines, and a main vertical open column formed by said frame for receiving jumper wires therein, said jumper wires being used to connect a selected incoming telephone line to a selected incoming central office line.

6. A modular distribution frame assembly for receiving subscriber or trunk incoming lines and central office lines, as set forth in claim 5 further including interconnecting means for connecting said protector blocks with said line terminal blocks.

7. A modular distribution frame assembly for receiving subscriber or trunk incoming lines and central office lines as set forth in claim 6, wherein said interconnecting means includes multi-conductor cables having connectors formed at each end, said protector blocks and said line terminal blocks having receptacles formed thereon for receiving said connectors.

8. A modular distribution frame assembly for receiving subscriber or trunk incoming lines and central office lines as set forth in claim 5, wherein the incoming or trunk lines are connected to said protector blocks and the incoming central office lines are connected to said line terminal blocks.

9. A modular distribution frame assembly for receiving subscriber or trunk incoming lines and central office lines as set forth in claim 5 further including a vertical barrier pan between said protector blocks and said line terminal blocks, a plurality of aligned vertically spaced apart retainers secured at one side of said pan and forming said main vertical open column for receiving the jumper wires therein.

10. The modular distribution frame assembly for receiving subscriber or trunk incoming lines and central office lines, as set forth in claim 5 wherein said plurality of protectors are arranged in vertically aligned, horizontally spaced apart columns, and wherein said plurality of line terminal blocks are arranged in vertically aligned, horizontally spaced apart columns.

* * * * *